United States Patent [19]

Chow

[11] 4,387,366
[45] Jun. 7, 1983

[54] CODE CONVERTER FOR POLARITY-INSENSITIVE TRANSMISSION SYSTEMS

[75] Inventor: Peter E. K. Chow, Nepean, Canada

[73] Assignee: Northern Telecom Limited, Montreal, Canada

[21] Appl. No.: 319,190

[22] Filed: Nov. 9, 1981

Related U.S. Application Data

[63] Continuation-in-part of Ser. No. 157,479, Jun. 9, 1980, abandoned.

[51] Int. Cl.³ .............................................. H04L 3/00
[52] U.S. Cl. ............................... 340/347 DD; 375/19
[58] Field of Search .................. 340/347 DD; 375/19; 371/55, 56

[56] References Cited

U.S. PATENT DOCUMENTS

| | | | |
|---|---|---|---|
| 3,302,193 | 1/1967 | Sipress | 340/347 DD |
| 3,439,330 | 4/1969 | Sipress | 340/347 DD |
| 3,587,088 | 6/1971 | Franaszek | 340/347 DD |
| 3,611,141 | 10/1971 | Waters | 340/347 DD |

Primary Examiner—C. D. Miller
Attorney, Agent, or Firm—John E. Mowle

[57] ABSTRACT

A polarity-insensitive code converter in which blocks of binary digits are translated into multilevel words having either one mode or another mode so that each coded word of one block of binary digits is the inverse coded word of the block of inverse binary digits. Hence, the inversion of a code word during transmission results in the inversion of the recovered binary. With additional precoding and postcoding of the binary signal, polarity integrity of the original signal can always be restored.

3 Claims, 1 Drawing Figure

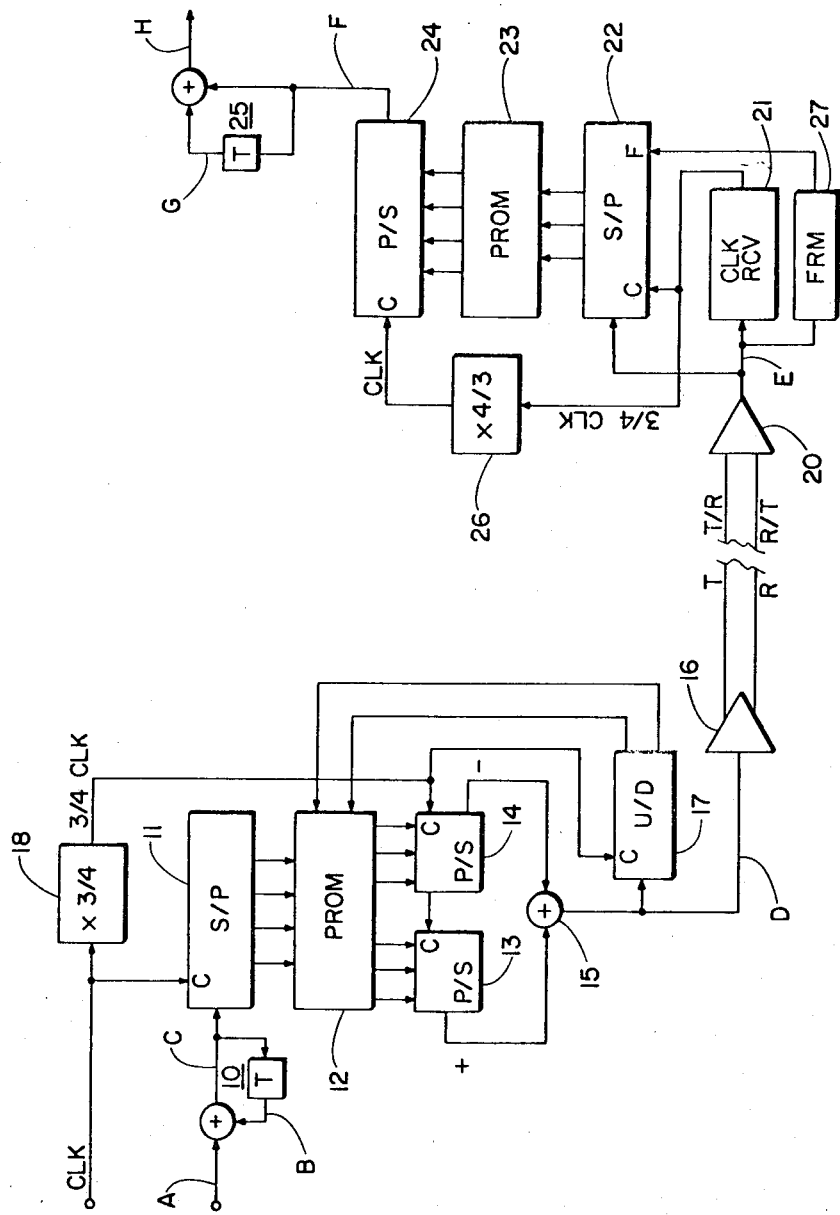

CODE CONVERTER FOR POLARITY-INSENSITIVE TRANSMISSION SYSTEMS

This application is a continuation-in-part of application Ser. No. 157,479, filed June 9, 1980, now abandoned.

This invention relates to a code converter and more particularly to one which translates blocks of binary digits into multilevel words so that the binary signal may be readily restored whether the multilevel words are inverted or not during transmission.

BACKGROUND OF THE INVENTION

Various forms of encoding have been used in the transmission of binary digital signals. The efficiency of such systems can be increased by using block codes of which the 4B-3T, MS43, and FOMOT block ternary codes are well-known examples. A comparison between these three codes is discussed in a paper entitled "Ternary Line Codes" by J. B. Buchner, Philips Telecommunication Review, Vol. 34, No. 2, June 1976, pages 72–86. The MS43 code is also described in U.S. Pat. No. 3,587,088 entitled "Multilevel Pulse Transmission Systems Employing Codes Having Three or More Alphabets" issued June 22, 1971 to Peter A. Franaszek. In order to decode these codes correctly, the transmission system must have polarity integrity (e.g. for each positive pulse transmitted, a positive pulse must be received). Hence, in a multi-paired cable transmission system, all cable connections (i.e. splices) require tip and ring integrity. Theoretically, such integrity is maintained in all cable transmission systems. However, due to the myriad of cable connections, complete polarity integrity is difficult to realize in a practical system.

It is known that the polarity of a binary signal can be restored utilizing a technique similar to that encountered in radio transmission caused by phase ambiguity. This involves passing the received binary signal through a binary-polarity insensitive circuit which has been precoded prior to transmission by a circuit with the inverse transfer function so that the binary output signal will be identical to that of the input signal.

STATEMENT OF THE INVENTION

This concept has now been extended by the present invention to block codes by translating the blocks of binary digits into multicharacter words having a particular relationship so that polarity integrity of the binary digits can also be restored whether the multicharacter words are inverted or not during transmission.

Thus, in accordance with the present invention there is provided a code converter comprising a translator for coding blocks of binary digits into multi-level words, each word being composed of digits having at least three possible levels. The converter includes a selector which is responsive to the polarity of the running digital sum of previously coded words for selecting the first or second word of opposite polarity. Each block of binary digits is coded so that each multi-level word of one block of binary words, is the inverse of the second multi-level word coded from another block of binary digits that is the inverse of that one block. Consequently, if polarity inversion takes place during transmission, the polarity inverted multilevel word is decoded as a block of inverted binary digits. This signal can then be further processed in a similar manner to that described above with respect to radio transmission so that polarity integrity of the binary digits may be restored.

In a particular embodiment the translator codes blocks of four binary digits into words of either a positive mode or a negative mode, each word having three ternary digits.

BRIEF DESCRIPTION OF THE DRAWING

An example embodiment of the invention will now be described with reference to the accompanying drawing which illustrates code translators and coders in a transmission system employing block codes in which polarity integrity is restored.

DESCRIPTION OF THE PREFERRED EMBODIMENT

Referring to the single FIGURE, the code translator provides a four binary to three ternary (4B/3T) block code conversion as shown in Table I. The unique feature is that each block of binary digits is coded so that a polarity inverted ternary word when decoded results in an inverted block of binary digits. With further processing of the input and output binary signals, this enables complete restoration of polarity integrity. The various reference characters A to H shown in the FIGURE identify the form and location of a typical sequence of digits shown in Table II which illustrates how polarity restoration is preserved whether or not the signal is inverted during transmission.

Binary digits A at the input to the system, are coupled through a typical precoder 10 into a four-bit serial to parallel converter 11 at the input to a translator. The converter 11 divides the digits into blocks of four bits which are then transmitted in parallel to a programmable read-only-memory 12. The memory 12 generates two three bit binary words representing either positive or negative portions of each ternary word in accordance with Table I. The two binary signals are fed to respective parallel to serial converters 13 and 14 which generate positive and negative signals respectively. The outputs of these two converters are combined in an adder 15 to produce the ternary output D which is coupled through an amplifier 16 to the tip and ring leads T and R of a transmission line.

Selection of the positive or negative mode by the memory 12 is controlled by an up-down counter 17 which measures the running digital sum of the positive and negative pulses of the ternary output D. If the resultant sum of the digits for the previous words is negative, a positive mode is selected, if the resultant sum of the digits is positive, a negative mode is selected, whereas, if the resultant sum of the digits is zero, the opposite mode (i.e. positive or negative) to that of the immediately preceding word is selected. The translator is under control of a clock signal (CLK) which is coupled directly to the serial to parallel converter 11 via a x$\frac{3}{4}$ CLK frequency converter 18 to the parallel to serial converters 13 and 14 and the up/down counter 17.

Thus, the output of converter 13 is a zero or positive polarity signal and the output of the converter 14 is a zero or negative polarity signal as illustrated in the drawing. The programmable read-only-memory (PROM) 12 is of conventional design and generates a parallel output to the two converters 13 and 14 in response to the four-bit binary address from the converter 11 and the state of the up-down counter 17. Thus, referring to the Table I, if the binary input was 1 1 0 0 the output of the PROM 12 to the converters 13 and 14 would be 1 1 0 and 0 0 1 respectively, if a positive mode signal was indicated by the state of counter 17. On the other hand, the output of the PROM 12 to the converters 13 and 14 would be 0 1 0 and 1 0 1 respectively if a negative mode signal was indicated. In the first instance, the converters 13 and 14 would generate ++0 and 0 0— signals which when summed in the adder 15 would produce the output ++—. The output —+— is generated in a similar manner when the converter outputs are 0+0 and —0— if a negative mode signal was indicated.

The transmitted ternary signal is coupled either directly from the tip and ring or if inverted from the ring and tip of the transmission line to an amplifier 20 at the input to a retranslator. The output of the amplifier 20 is fed to a clock recovery circuit 21, a framing circuit 27 and to the input of a serial to parallel converter 22. The clock recovery circuit 21 is of conventional design with an output signal frequency equal to the transmission rate of the ternary signals, which as indicated is three quarters the initial frequency of the binary clock signal CLK. The three digit ternary words at the output of the serial to parallel converter 22 are connected to a programmable read-only-memory 23 which generates blocks of four-bit binary digits which are fed through a parallel to serial coverter 24 to derive the decoded binary digits F at its output. Thus the programmable read-only-memory 23 simply generates a four-bit binary output to the parallel-to-serial converter 24 in response to the three-bit ternary address from the serial-to-parallel converter 22, which is in accordance with Table I. The converter 22 is under direct control of the recovered CLK while the converter 24 is controlled by the output of a x4/3 CLK frequency converter 26 of the recovered clock signal. The binary signal F is connected through a binary-polarity of the original signal A. The framing circuit 27 which is of conventional design is used to determine the start of the next code word. The principle of the framing circuit is based on the running digital sum. If the running digital sum at the end of each code word exceeds +3 or —3, the start of the next code word is false. The circuit 27 then automatically adjusts so that a different start of code words will result until no further violations are detected. The techniques for detecting the running digital sum and for slipping a pulse whenever false synchronization is detected are both well-known.

Both the precoder 10 and the postcoder 25 include a one-bit delay T and a modulo-2 adder +. The precoder 10 is arranged to have the inverse transfer function of the postcoder 25. Various circuit realizations can be used for both the precoder and postcoder. As long as the number of taps at the input to the adder in the postcoder is an even number, its output will have the same polarity whether or not the input is inverted. Consequently, polarity integrity can be restored when these two coders are used in conjunction with a translator in which each block is coded so that each coded word of one block of binary digits is the inverse coded word of the block of binary digits that is the inverse of that one block, as shown in Table I.

This can be better understood from Table II in which the original binary input signal A is coupled to a modulo-2 adder + in precoder 10 which has as its second input B. Input B is identical to output C delayed by one bit T. The binary output C of the precoder 10 is converted in the translator to ternary words D which are shown being received at E without inversion and at E' with inversion. The decoded binary signal F is delayed as shown in G and then summed in the postcoder 25 to produce the binary output signal H which is identical to that of A. Similarly, the received ternary signal with inversion E' after translation produces the decoded binary signal F' which after passing through the postcoder 25 produces the binary signal GH' which is again identical to that of the input binary signal A.

In this example embodiment, the ternary words are illustrated as having either a positive or negative mode. It will be evident that this can be realized in a variety of ways, and that the length of the words, and the number and type of characters need not be limited to that shown providing that the words are translated from binary to multilevel and back again as detailed above.

TABLE I

| Binary | +ve Ternary | —ve |
|---|---|---|
| 0000 | 0—+ | 0—+ |
| 1111 | 0+— | 0+— |
| 0001 | —+0 | —+0 |
| 1110 | +—0 | +—0 |
| 0010 | —0+ | —0+ |
| 1101 | +0— | +0— |
| 0011 | +—+ | ——+ |
| 1100 | ++— | —+— |
| 0100 | 0++ | —0— |
| 1011 | +0+ | 0—— |
| 0101 | 0+0 | —00 |
| 1010 | +00 | 0—0 |
| 0110 | 00+ | +—— |
| 1001 | —++ | 00— |
| 0111 | ++0 | ——— |
| 1000 | +++ | ——0 |

TABLE II

| | / | / | Block | / | / |
|---|---|---|---|---|---|
| A | 1101 | 1110 | 0010 | 1101 | 0101 |
| B | 1011 | 0101 | 1110 | 0100 | 1100 |
| C | 0110 | 1011 | 1100 | 1001 | 1001 |
| D | 00+ | 0—— | ++— | 00— | —++ |
| E | 00+ | 0—— | ++— | 00— | —++ |
| F | 0110 | 1011 | 1100 | 1001 | 1001 |
| G | 1011 | 0101 | 1110 | 0100 | 1100 |
| H | 1101 | 1110 | 0010 | 1101 | 0101 |
| E' | 00— | 0++ | ——+ | 00+ | +—— |
| F' | 1001 | 0100 | 0011 | 0110 | 0110 |
| G' | 0100 | 1010 | 0001 | 1011 | 0011 |
| H' | 1101 | 1110 | 0010 | 1101 | 0101 |

What is claimed is:

1. A code converter comprising:
   a translator for coding blocks of binary digits into first or second multi-level words, each word being composed of digits having at least three possible levels, the digital sum of the digits of each of the first and second words being equal to zero, or being opposite in polarity to each other;
   a selector responsive to the polarity of the running digital sum of previously coded words for selecting the first or second word of opposite polarity; characterized by:
   each block of binary digits is coded so that each first multi-level word coded from one block of binary digits, is the inverse of the second multi-level word coded from another block of binary digits that is the inverse of that one block of binary digits; whereby polarity integrity of the binary digits may be restored.

2. A code converter as defined in claim 1 in which blocks of four binary digits are converted into three digit ternary words; and the first words are grouped in a positive mode having a zero or positive polarity, and the second words are grouped in a negative mode having a zero or negative polarity.

3. A code converter as defined in claim 2 which additionally comprises:

a code converter for retranslating the three digit ternary words back to blocks of four binary digits;

a postcoder for restoring binary polarity integrity to the blocks of four binary digits from the code reconverter; and a precoder having an inverse transfer function to the postcoder for processing the binary input signal to the code converter so that the binary output signal from the postcoder will be identical to said input signal.

* * * * *